United States Patent

Shintani et al.

(10) Patent No.: US 6,832,216 B2
(45) Date of Patent: Dec. 14, 2004

(54) METHOD AND SYSTEM FOR MINING ASSOCIATION RULES WITH NEGATIVE ITEMS

(75) Inventors: Takahiko Shintani, Tokyo (JP); Itaru Nishizawa, Koganei (JP); Kazutomo Ushijima, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 152 days.

(21) Appl. No.: 10/024,210

(22) Filed: Dec. 21, 2001

(65) Prior Publication Data

US 2003/0009456 A1 Jan. 9, 2003

(30) Foreign Application Priority Data

Mar. 16, 2001 (JP) ....................................... 2001-075366

(51) Int. Cl.$^7$ ............................................. G06F 17/30
(52) U.S. Cl. ................................................. 707/2; 707/6
(58) Field of Search .............................. 707/1, 6, 2, 4, 707/10, 104.1; 706/1, 21, 45, 47

(56) References Cited

U.S. PATENT DOCUMENTS

| 6,182,070 B1 | * | 1/2001 | Megiddo et al. | ................. | 707/6 |
| 6,263,327 B1 | * | 7/2001 | Aggarwal et al. | ............. | 706/47 |
| 6,278,997 B1 | * | 8/2001 | Agrawal et al. | ................ | 707/6 |

FOREIGN PATENT DOCUMENTS

JP 11-328186 6/1998

OTHER PUBLICATIONS

Savasere et al. "Mining for strong negative associations in a large database of customer transactions"; Proceedings of International Conference on Data Engineering, 1998.*

Rakesh Agrawal, Tomasz Imielinski and Arun Swami, "Mining association rules between sets of items in large databases," IBM Almaden Research Center, SIGMOD /5/93/Washington, D.C. (1993), pp. 207–216.

Rakesh Arawal and Ramakrishnan Srikant, "Fast algorithms for mining association rules," Proceedings of the 20$^{th}$ VLB Conference, Santiago, Chile (1994), pp. 487–499.

Jiawei Han, Jian Pei and Yiwen Yin, "Mining frequent patterns without candidate generation," School of Computing Science, Simon Fraser University.

Ashok Savasere, Edward Omiecinski and Shamkant Navathe, "Mining for strong negative associations in a large database of customer transactions," College of Computing, Georgia Institute of Technology.

* cited by examiner

*Primary Examiner*—Diane D. Mizrahi
*Assistant Examiner*—Apu M Mofiz
(74) *Attorney, Agent, or Firm*—Reed Smith LLP; Stanley P. Fisher, Esq.; Juan Carlos A. Marquez, Esq.

(57) ABSTRACT

By introducing the concept of negation into an association rule, the number of combinations of items, serving as candidates of the association rule containing negative items, becomes enormous for mining. The invention sorts out frequent itemsets to be included in an association rule in advance by ensuing its upper bound of confidence satisfying conditions of a confidence and a confidence increment input by an user. Also, by checking a logic product for each bit of a bit string reflecting the presence of each item in the itemset, the combinations of items as candidates are pruned. The pruning of unnecessary combinations is effectively carried out. The number of combinations of the items for compiling association rules is reduced.

16 Claims, 9 Drawing Sheets

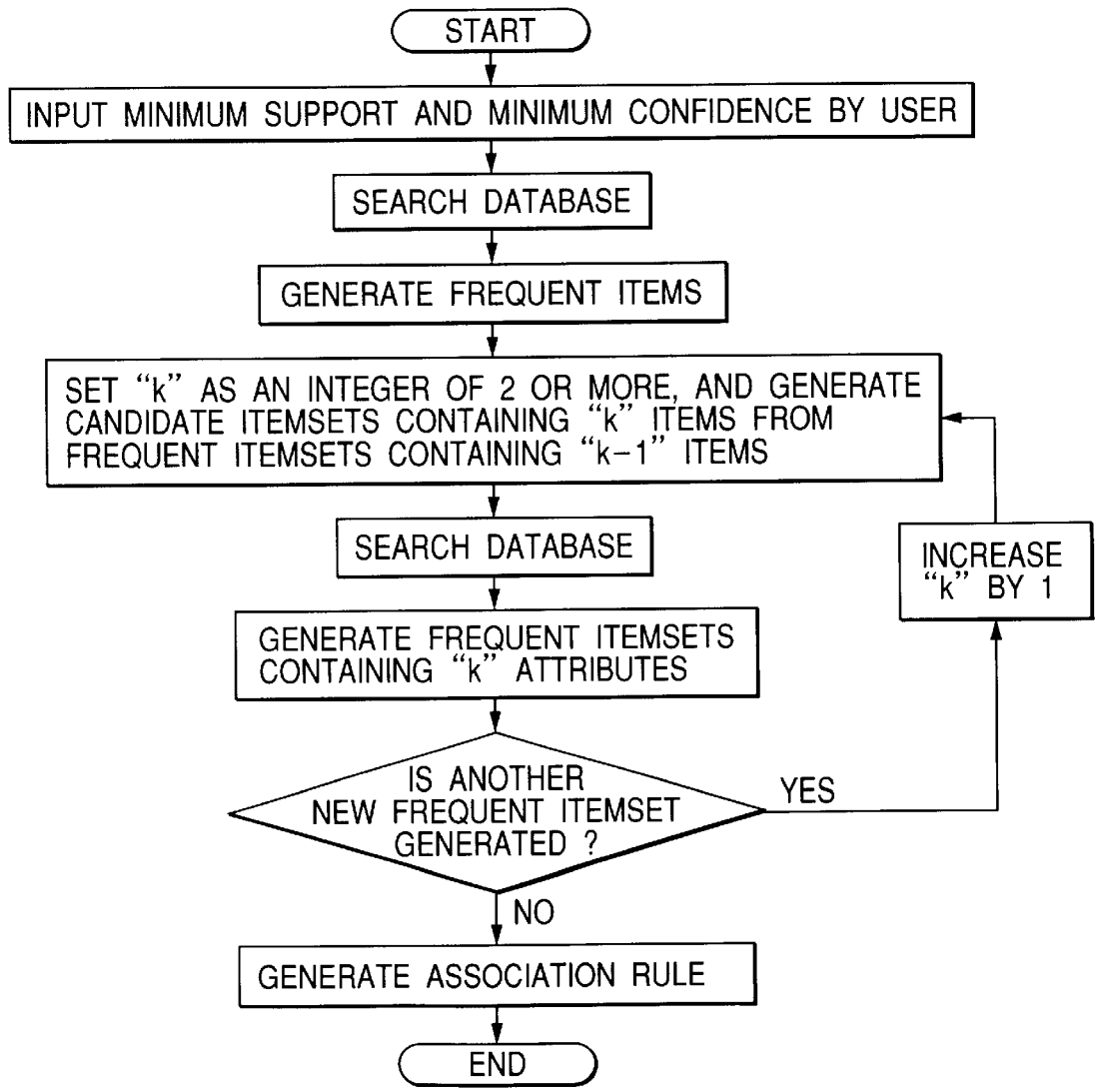

FIG. 8

| FREQUENT ITEMSET | | SUPPORT COUNT | SUPPORT |
|---|---|---|---|
| L(1) | A | 4 | 0.33 |
|  | B | 7 | 0.50 |
|  | C | 8 | 0.67 |
|  | E | 7 | 0.58 |
|  | H | 3 | 0.25 |
|  | J | 5 | 0.42 |
|  | K | 4 | 0.33 |
| L(2) | AB | 3 | 0.25 |
|  | AC | 3 | 0.25 |
|  | AE | 3 | 0.25 |
|  | BC | 3 | 0.25 |
|  | BE | 4 | 0.33 |
|  | BK | 3 | 0.25 |
|  | CE | 4 | 0.33 |
|  | CH | 3 | 0.25 |
|  | CJ | 4 | 0.33 |
|  | EJ | 5 | 0.42 |
| L(3) | CEJ | 4 | 0.33 |

METHOD AND SYSTEM FOR MINING ASSOCIATION RULES WITH NEGATIVE ITEMS

BACKGROUND OF THE INVENTION

The present invention relates to a method and a system for data analysis of a database and a data warehouse. In particular, the invention relates to data mining, i.e. analysis of any hidden association of data in database.

In data mining for mining useful information buried in an enormous amount of data by analyzing the data, an association rule is discovered, which indicates association of data. For instance, by mining an association rule in the analysis of receipt data, i.e. a record of purchase of customer, in retail business, it is possible to know the purchase pattern of each customer. When a rule is mined, which means: "a customer who purchased commodity A and commodity B at the same time is very likely to buy commodity C and commodity D at the same time", it is found that commodities A and B are related to the sale of commodities C and D, which is useful in determining the sales policy, e.g. in display and arrangement of commodities or selection of special price commodity.

According to the conventional type association rule, number of appearances of a specific item is counted in a group of data, which comprises a plurality of items, and at least one rule of association between the items is obtained. Description is given below on examples. When a database comprising 5 items of A1, A2, A3, A4 and A5 is given as shown in FIG. 2, an association rule between the items as shown in the equation 5 is obtained:

$$(A1=yes) \cap (A3=yes) \Rightarrow (A5=yes) \quad (5)$$

This is an association rule, which means: "In the data where items A1 and A3 appear, item A5 is also likely to appear very often." This is called an "association rule". The association rule is expressed as:

$$(Assumption) \Rightarrow Conclusion) \quad (6)$$

Each of the assumption and the conclusion comprises at least one items respectively. In case of (equation 5), the assumption is: $(A1=yes) \cap (A3=yes)$, and the conclusion is $(A5=yes)$.

The association rule has two indices: support and confidence. Support is an amount of data, to which an association rule is applicable, i.e. a ratio of data where a combination of items in the association rule appears. Also, the number of times of appearances of the combination of items is called a "support count". Confidence is an accuracy index of the association rule, i.e. the ratio, at which the conclusion is satisfied when the assumption of association rule is satisfied.

For instance, in case of the association rule given in the equation 5 mined from the database of FIG. 2, it is evident that the total number of records is 5, and the number of records supporting the association rule of the equation 5 is 2. Thus, the support count is 2 and the support is 0.4(40%). With regard to confidence, it is evident that number of records where all items in the association rule of the equation 5 appear is 2 and that number of records where the items of the assumption appear is 3. Thus, confidence is about 0.67(67%).

The studies on mining of the association rule have been performed in the field of data mining. For instance, the studies are described in the following references:

(1) R. Agrawal, T. Imielinski, and A. Swami: "Mining association rules between sets of items in large databases"; Proceedings of the ACM SIGMOD Conference on Management of Data, May 1993. (Reference 1)

(2) R. Agrawal and R. Srikant: "Fast algorithms for mining association rules; Proceedings of the 20th VLDB Conference, 1994. (Reference 2)

According to these methods, from the database comprising a plurality of items, all association rules are mined, which satisfy minimum support and minimum confidence, i.e. minimum values of support and confidence set by the user. These methods are based on the property that support of a product set of items (hereinafter referred as "itemset") cannot be smaller than the support of an itemset $(Y \supseteq X)$ contained in X, and pruning candidates of an association rule is performed. This method can be achieved according to the block diagram of FIG. 3. First, a database is retrieved, and the number of appearances of each of the items is counted (support count), and any item which satisfies minimum support is picked up. These are called "frequent items". Next, 2 items in the frequent items are combined, and an itemset is prepared, for which both support count and support are not known. This itemset is called "candidate itemset". The database is retrieved again, and support count of each of the candidate itemsets is counted, and an itemset is obtained, which satisfies minimum support. The itemset satisfying the minimum support is called "frequent itemset". Then, from the frequent itemset containing (k-1) items, itemsets are combined, which have the leading (k-2) items equal to each other, and a candidate itemset comprising "k" items is prepared. In this case, based on the property of the above-mentioned itemset, pruning of the candidate itemset is performed. Specifically, when a combination of items not present in the frequent itemset comprising (k-1) items is contained in the candidate itemset, which comprises "k" items prepared above, the candidate itemset is deleted. Next, the support count of each of the candidate itemsets is counted by retrieving the data from the database. The itemset to satisfy minimum support is picked up, and a frequent itemset is obtained. This process is repeated for each number of items, and this is continued until the newly picked frequent itemset turns to be empty. When the process to obtain the frequent itemset has been completed, all frequent itemsets to satisfy minimum support has been picked up. Next, using the frequent itemset thus obtained, all association rules are derived. From the frequent itemset when the number of items "k" is 2 or more, at least one association rule is derived, which has "n" items in an assumption and (k-n) items in a conclusion. Here, "n" is an integer of less than "k". For instance, from a frequent itemset ABC having 3 items, 6 association rules can be derived: $\{A, B\} \Rightarrow \{C\}$, $\{A, C\} \Rightarrow \{B\}$, $\{B, C\} \Rightarrow \{A\}$, $\{A\} \Rightarrow \{B, C\}$, $\{B\} \Rightarrow \{A, C\}$, and $\{C\} \Rightarrow \{A, B\}$. As soon as the association rules are derived, the confidence of the association rule is calculated from the supports of the itemset in the association rules and the itemset in the assumptions, and only the association rules are mined, which satisfy minimum confidence set by the user. For instance, in case the support of the itemset $\{A, B, C\}$ is 0.3 and support of the itemset $\{A, C\}$ is 0.4, confidence of the association rule $\{A, C\} \Rightarrow \{B\}$ is calculated as 0.75 (75%).

The method for efficiently mining the frequent itemset is described, for instance in: J. Han, J. Pei, and Y. Yin: "Mining frequent patterns without candidate generation"; Proceedings of ACM SIGMOD International Conference on Management of Data, 2000(Reference 3). In the reference 3, database is retrieved at first, and a frequent item satisfying a minimum support value is searched. Again, the database is retrieved, and a tree structure containing only the frequent items in the records of the database is constructed, and this is stored in the main memory. By analyzing only the tree structure in the main memory, all frequent itemsets containing 2 or more items are mined.

The association rules mined by the methods of the references 1, 2 and 3 are only the rules, i.e. affirmation. For instance, from the database shown in FIG. 2, the association rule $\{A1,A3\} \Rightarrow \{A5\}$ is mined by the above method. This means: $(A1=yes) \cap (A3=yes) \Rightarrow (A5=yes)$. That is, when A1 and A3 are contained in the data, it is a relation where A5 is also contained. Here, the fact that a certain item A is contained in the data, i.e. a item expressed as (A=yes) is called "affirmative item". Also, an expression that the item A is not contained in the data, i.e. a item, which means the reverse of the affirmative item and is expressed as (A=no), is called "negative item".

The method for mining association rules with negative items is described, for instance, in:

(1) A, Savasere, E. Omiecinski, and S. Navathe: "Mining for strong negative associations in a large database of customer transactions"; Proceedings of International Conference on Data Engineering, 1998. (Reference 4)

(2) Japanese Patent Publication No. 11-328186: "Method for generating association rule and system for generating association rule". (Reference 5)

According to these references, the association rules are mined, which contain only affirmative items in the assumption or only negative items in the conclusion, e.g. an association rule $(A=yes) \cap (B=yes) \Rightarrow (D=no)$, meaning that "when phenomena A and B occurs, phenomenon D does not occur".

In the reference 4, classification hierarchy of items is used. An expected value of support count of the itemset in the conclusion is obtained. If the support count in the database is smaller than the expected value, it is mined as an association rule of negation. For instance, when the item A is an upper hierarchy of the items B and C and support of an itemset AX is 10% for an item X in a different hierarchy, the expected value of the support of each of the itemsets BX and CX is calculated as 5% respectively. Here, if the support of actual itemset BX is 2%, the itemset is smaller than the expected value of the support. Thus, from the itemset, the following association rule is derived:

$$X \Rightarrow \lnot B \quad (7)$$

According to the reference 5, confidence is calculated, and a $X^2$ test (chi square test) is performed from the support of the itemset in the assumption and from the support of the itemset in the conclusion, and an association rule statistically significant (although low in confidence) is mined.

As described above, according to the conventional methods, an association rule containing only affirmative items, or an association rule containing only affirmative items in the assumption and only negative items in the conclusion is mined, and no consideration is given on the "association rule, which contains negative items in the assumption". This association rule may offer important information, which is not indicated by the conventional simple association rules. For instance, when consideration is given only on affirmative items from a manufacture data, a rule is mined as: "When materials A and B are used as raw materials for a product, non-defective percentage is 70%." When consideration is given on negative items, a rule may be mined as: "When materials A and B are used but material X is not used, non-defective percentage is 95%." By giving consideration on negation, it is possible to mine more accurate knowledge. In the field of gene analysis, regarding data such as ratio of expression pattern, SNPs, diseases, effect of drug, blood sugar value, etc., side effects of the drug can be prevented if the following knowledge is obtained: "In case 1000-th base is A (adenine), 1100-th base is T (thymine), and 1550-th base is not G (guanine) in a certain human gene, drugs X and Y have effects, but drug Z has no effect", or "In case a marker gene X is homo and a marker gene Y is not homo, disease Z is more likely to develop." It is also possible to administer drugs or perform treatments by giving consideration on individual difference depending on human genotypes.

In the analysis of problems where a great number of phenomena are related with each other in complicated manner, it is necessary to give consideration not only on affirmative items but also on negative items and to mine correlation where these are related to each other. However, no method has been proposed so far, which is used for efficiently mining the association rule. As the association rule containing negative items, a method has been proposed to mine the association rules which have only negative items in the conclusion. However, by this method, it is not possible to find an association rule where affirmative items and negative items are mixed together. Also, it is possible, in principle, to consider the negative items by the method for mining conventional association rule, which gives consideration only on affirmative items. However, enormous number of data combinations must be checked as candidates for the association rules, which is practically impossible in fact under the prior art scheme. According to the conventional method, pruning is performed on the candidate itemsets to be retrieved by utilizing property of the support between the itemsets. When consideration is given only on the affirmative items, this pruning method is effective. The pruning method is also applicable to the itemset containing negative items. However, no effect is obtained for the itemset which has both affirmative and negative items. For instance, it is supposed that an item B is contained in the database and the support of the item B does not satisfy the minimum support condition set by the user. Here, it is assumed that the minimum support is less than 50%. When only the affirmative items are considered, the combination containing the item B is pruned, and it is not contained in the candidate itemset. However, the support of B which means negation, i.e. negative item of B (B=no), satisfies minimum support. Therefore, when negative items are considered, the item B is present as a negative item such that it is not pruned and it is contained in the candidate itemset. Thus, the number of candidate itemsets to be retrieved stays the same. As a result, the candidates to be retrieved will be enormous. The method of the reference 3 cannot be used for mining frequent itemsets containing negative items unless the types of the items in the database to be processed are extremely small. According to the method of the reference 3, only the frequent items are considered, and it is assumed that the number of the frequent items is not many and that the database can be converted to a small tree structure, which can be maintained in the main memory. As described above, when negative items are considered, the number of items to be processed cannot be reduced, and the assumption of the reference 3 is not feasible.

SUMMARY OF THE INVENTION

It is a first object of the present invention to provide a method and a system for mining association rules containing negative items.

It is a second object of the present invention to provide a system, which decreases number of candidate itemsets, i.e. a combination of the data to be retrieved.

One of the features of the method for mining association rules according to the present invention is that an association rule is mined from a database comprising data with discrete values, the association rule satisfying a support and a confidence of the association rule designated by a user and a minimum support, a minimum confidence, and a minimum confidence increment, i.e. a minimum value of confidence by adding negative items, said association rule containing at least one negative item and at least one affirmative item in an assumption, and at least one affirmative item in a conclusion.

According to one aspect of the invention, the method for mining at least one association rule based upon data in a database containing attributes, comprising: defining each of the attributes with a respective attribute values as an item, and defining the database as a plurality sets of items, and defining each of the sets of items in the database as a record; defining an item appearing in one of the sets as an affirmative item in the set, and defining an item absent from the set as a negative item in the set; and mining the association rule by applying at least one logical AND operation on an assumption of one association rule containing at least one negative item and at least one affirmative item so as to obtain a conclusion of the association rule containing at least one affirmative item.

The above-mentioned method may further comprises the steps of applying at least one logical AND operation on at least two items to generate an itemset; providing plurality sets of itemsets to be included in the database; defining a support count of one item or one itemset as a number of times the item or the itemset appearing in different records of the database; defining a support count of one association rule as the support count of the itemset in (the assumption AND the conclusion); calculating a support of the item, the itemset or the association rule by dividing the support count of the item, the itemset or the association rule with a total number of records in the database; calculating a confidence of the association rule by dividing a support count of the itemset in (the assumption AND the conclusion) with a support of the item or the itemset in the assumption; and for the association rule containing at least one negative item in the assumption, calculating a confidence increment by omitting the negative item in the assumption of the association rule thereby calculating a confidence of a simplified association rule, which is obtained by omitting the negative item from the assumption of the association rule, to obtain an evaluation value, and dividing the confidence of the association rule with the evaluation value.

According to a first particular aspect of the invention, the method may further comprise the steps of dividing the database into a plurality of partitions in possible ways generating a bit vector for each affirmative items in the database based upon whether the item appears in each of the partitions by assigning 1 to a p-th bit if the candidate itemset appears in the p-th partition or 0 if the candidate itemset is absent from the p-th partition; and disregarding a candidate itemset if none of the partitions having 1 in the bit vector for all items contained in the candidate itemset.

According to a second particular aspect of the invention, the method may further comprises the steps of dividing the database into a plurality of partitions in possible ways; and disregarding a candidate itemset if none of the partitions contains all items contained in the candidate itemset. According to a third particular aspect of the invention, the method may further comprise a first set of additional steps including: inputting a minimum value of support, a minimum value of confidence, and a minimum value of confidence increment of the association rule, whereby the mining step, frequent itemsets, which satisfies the minimum value of support, are used to sort out association rules, which consist of frequent itemsets and satisfy the minimum value of confidence as well as the minimum value of confidence increment.

Alternatively, the method may further comprise a second set of additional steps including: inputting a minimum value of support, a minimum value of confidence, and a minimum value of confidence increment of the association rule; providing a itemset X containing at least two affirmative items and being applied upon a logical AND operation in conjunction with a negative item ~a to generate a candidate itemset X~a so as to provide a plurality of candidate itemsets; calculating an upper bound of confidence of a candidate itemset X~a by estimating a confidence value for each of the association rule, which a candidate itemset X~a can generate, by calculating a support count of each of subset itemsets X' of the frequent itemset X ("Supp(X')"), a support count of an inverted item a of the negative item ~a in X~a ("Supp(a)"), and a support count of X ("Supp(X)"), selecting the smallest value in {Supp(X')}, and selecting a bigger value in {(the smallest value of Supp(X'))-Supp(a), Supp(X)}; sorting out candidate itemsets, each of which upper bound of confidence is bigger than the minimum value of confidence thereby compiling the frequent itemsets; and sorting out frequent itemsets from the plurality of candidate itemsets, which satisfies the minimum value of support thereby compiling association rules, which consist of frequent itemsets.

The method may further comprise a third set of additional steps including: inputting a minimum value of support, a minimum value of confidence, and a minimum value of confidence increment of the association rule; providing an itemset X containing at least two affirmative items and being applied upon a logical AND operation in conjunction with an itemset ~A containing at least two negative items to generate a candidate itemset X~A so as to provide a plurality of candidate itemsets; calculating an upper bound of confidence of a candidate itemset X~A by estimating the confidence value for each of the association rules, which a candidate itemset X~A can generate, by calculating a support count of each of the subset itemset X' of the frequent itemset X ("Supp(X')"), the sum of support counts of inverted items in the itemset ~A ("Sum(A)"), and a support count of X ("Supp(X)"), selecting the smallest value of {Supp(X')}, and selecting bigger value in {(the smallest value of Supp(X'))-Sum(A),Supp(X)}; sorting out candidate itemsets, each of which upper bound of confidence is bigger than the minimum value of confidence thereby compiling the frequent itemsets; and sorting out frequent itemsets from the plurality of candidate itemsets, which satisfies the minimum value of support thereby compiling association rules, which consist of frequent itemsets.

The systems or apparatus for implemented the aforementioned methods are intended to be included in the invention.

Another feature of the present method comprises the following steps:

(1) a step for calculating a support count of the itemset X~Y by combining the support counts of the itemsets X and ~Y contained in the itemsets X and Y, the itemsets X and Y containing only affirmative items, and an itemset ~Y containing only negative items, as follows:

$$Supp(x_1 \cap \ldots \cap x_m \cap \sim y_1 \cap \ldots \cap \sim y_n) \quad \text{(Equation 8)}$$
$$= Supp(X \sim Y)$$
$$= Supp(X) + \sum_{i=1}^{n} \sum_{\substack{Z \subseteq y_1 \\ |Z|=i}} \{(-1)^i \times Supp(XZ)\}$$

where

| | |
|---|---|
| Supp(X): | Support counts of itemset X |
| \|X\|: | Number of items in itemset X | wherein a set of attribute values is defined as a record, a database is defined as a set of records, which also serves as a list of items. An item appearing in a record is defined as an affirmative item in the record, and an item not appearing in the record is defined as a negative item in the record. A product set of a plurality of items is defined as an itemset. A support count of one item or one itemset is a number of times the item or the itemset appearing in different records of the database. A support count of one association rule is the support count of the itemset in (X~Y). A support of the item, the itemset or the association rule is obtained by dividing the support count of the item, the itemset or the association rule with a total number of records in the database.

(2) a step for deriving an association rule (X-A) ~Y⇒A containing at least one affirmative item and at least one negative item in an assumption, and at least one affirmative item in a conclusion, and further, an association rule (X-A)(~Y-~B)⇒A~B containing negative items also in the conclusion from the above itemset X~Y;

(3) a step for preparing a candidate itemset X~a with support count unknown by combining a negative item ~a with a frequent itemset comprising only affirmative items where an itemset satisfying a minimum support is defined as a frequent itemset, and for calculating a condition where upper bound of confidence of the association rule derivable from the candidate itemset and containing a negative item ~a in the assumption does not satisfy minimum confidence, using $$MaxConf = \frac{Supp(X)}{\max\{\min\{Supp(X') \mid X' \subset X\} - Supp(a), Supp(X)\}} \quad \text{(Equation 1)}$$

where

| | |
|---|---|
| MaxConf: | Upper bound of confidence |
| Supp(X): | Support count of itemset X |
| X': | Subset of itemset X | and for deleting a candidate itemset where the calculated value does not satisfy minimum confidence; or for calculating a condition of support count of an item "a" constituting the negative item ~a on the association rule containing the negative item ~a in the assumption, using:

$$\theta(a) = \min\{Supp(X') \mid X' \subset X\} - \frac{Supp(X)}{\text{(Minimum confidence)}} \quad \text{(Equation 2)}$$

where

| | |
|---|---|
| θ(a): | Minimum value of support count of item "a" |
| Supp(X): | Support count of itemset X |
| X': | Subset of itemset X | and for deleting a candidate itemset where support count of the item "a" is less than the calculated value;

(4) a step for preparing a product set of two frequent itemsets containing all affirmative items and (n-1) negative items in common in the itemset where n is an integer larger than 0, k is an integer larger than 1, in a frequent itemset comprising "n" negative items and "k" affirmative items and an itemset deleted by the calculated values using the equations 3 or 4, for preparing an itemset containing "k" affirmative items and (n+1) negative items, and for setting an itemset to a candidate itemset, wherein all subsets prepared from the itemset is contained in the frequent itemset or in the itemset deleted by the calculated values calculated using the equations 3 or 4; and (5) a step for preparing a plurality of partitions by dividing the database, for preparing a bit string where an affirmative item contained in the records of the partition is set to 1 for each partition, for finding a combination of items where bit of the same partition is not turned to 1 in the bit string, and for deleting the candidate itemset containing said combination of items.

Other and further objects, features and advantages of the invention will appear more fully from the following description.

BRIEF DESCRIPTION OF THE DRAWINGS

The preferred embodiments of the present invention are illustrated in the accompanying drawings in which:

FIG. 2 is a table for explaining a conventional type association rule;

FIG. 3 is a flow chart for mining a conventional type association rule containing only affirmative items;

FIG. 8 is a table showing frequent itemsets containing only affirmative items in one embodiment of the present invention;

DETAILED DESCRIPTION OF THE PREFERRED EMBODIMENTS

Figure 1:
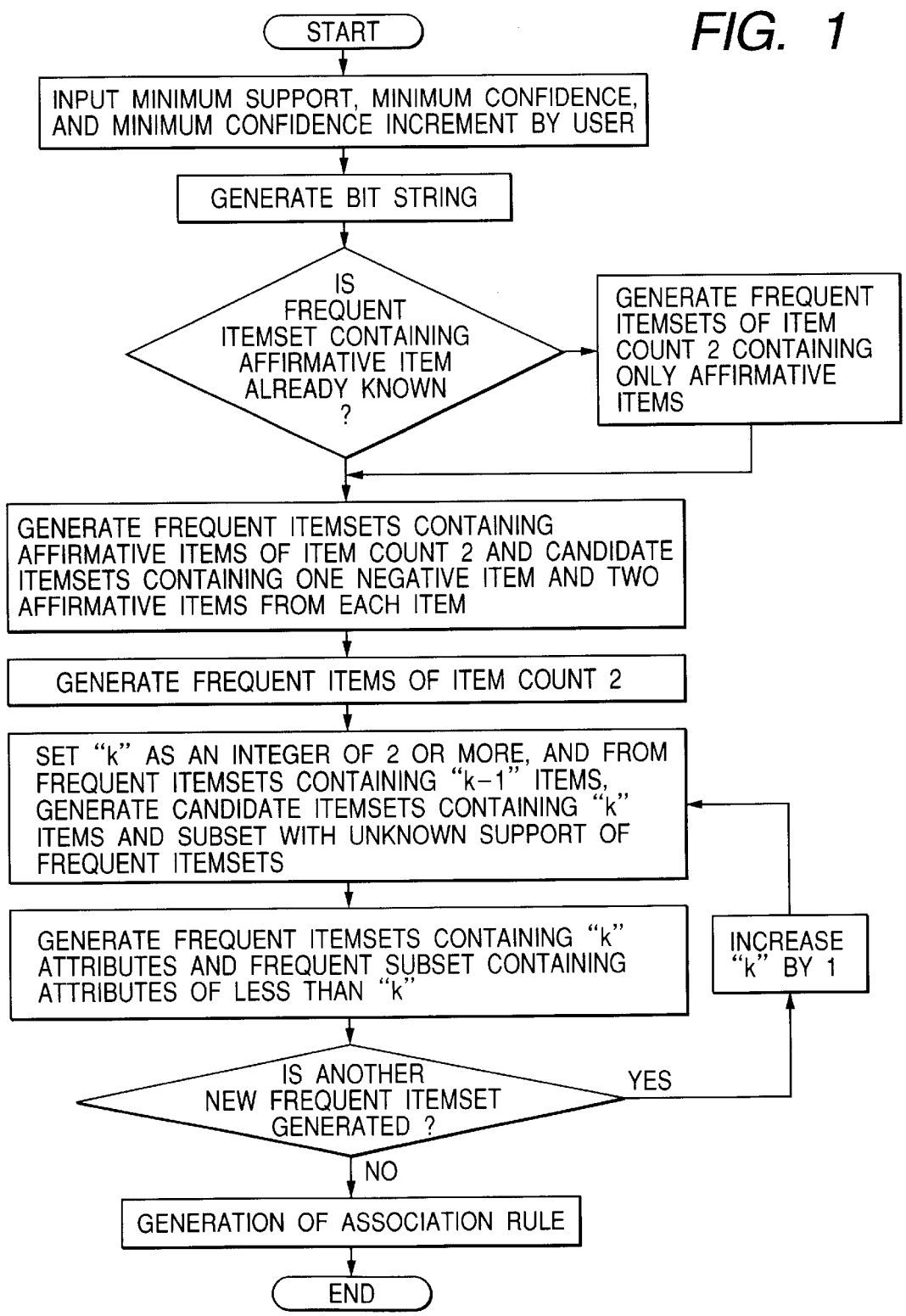
FIG. 1 is a flow chart for mining association rules containing negative items according to the present invention.

First, the terms used in the present embodiment are defined. Database comprises attributes with discrete values, and a set of attributes and discrete values is defined as an item. A database comprises a plurality sets of items and each of the sets of items in the database is a record. An item appears in one of the sets is an affirmative item in the set, and an item absent from the set is a negative item in the set. An itemset is generated by applying at least one logical AND operation on at least two items. A product set of a plurality of items is defined as an itemset and a ratio of the records containing the itemsets in the database is defined as support. The number of records is defined as support count. An association rule is expressed as:

$$X \Rightarrow Y \quad (9)$$

where X and Y each represents an itemset. X is defined as an assumption of the association rule, and Y is defined as a conclusion of the association rule. The association rule has support and confidence. A support count of one item or one itemset is a number of times the item or the itemset appearing in different records of the database. A support count of one association rule is the support count of the itemset in (X~Y). A support of the item, the itemset or the association rule is obtained by dividing the support count of the item, the itemset or the association rule with a total number of records in the database. Confidence is defined as a ratio of records containing the itemsets of the conclusion Y of the rule at the same time in the records, which contain the itemsets of the assumption X of the rule. That is, it is a conditional probability expressed as P(Y|X). The association mined according to the present invention is an association rule, which contains at least one affirmative item and at least one negative item in the assumption and contains at least one affirmative item in the conclusion. The association rule containing negative items is expressed as:

$$X\text{\textasciitilde}A \Rightarrow Y\text{\textasciitilde}B \quad (10)$$

where X and Y each represents an itemset including at least one affirmative items. ~A represents an itemset comprising at least one negative items. ~B represents an itemset comprising 0 or more negative items. The following relationship exists: X∩Y∩A∩B=Φ. In the mining of the association rule in the present invention, all association rules are mined, which satisfy a minimum support, a minimum confidence and a minimum confidence increment as specified by the user, i.e. the minimum value of each support, confidence and confidence increment. The confidence increment is explained below. The confidence Conf (X~A⇒Y~B) of the association rule containing negative items expressed in the mathematical formula or equation (10) and in the confidence Conf (X⇒Y~B) by deleting negative items from the assumption of the association rule, the confidence increment is a value calculated by:

$$\text{(Confidence increment)} = \frac{Conf((X \sim A) \Rightarrow Y \sim B)}{Conf(X \Rightarrow Y \sim B)} \quad \text{(Equation 11)}$$

where

Conf(X⇒Y): Confidence of association rule X⇒Y

Also, an itemset satisfying the minimum support is defined as a frequent itemset.

Figure 4:
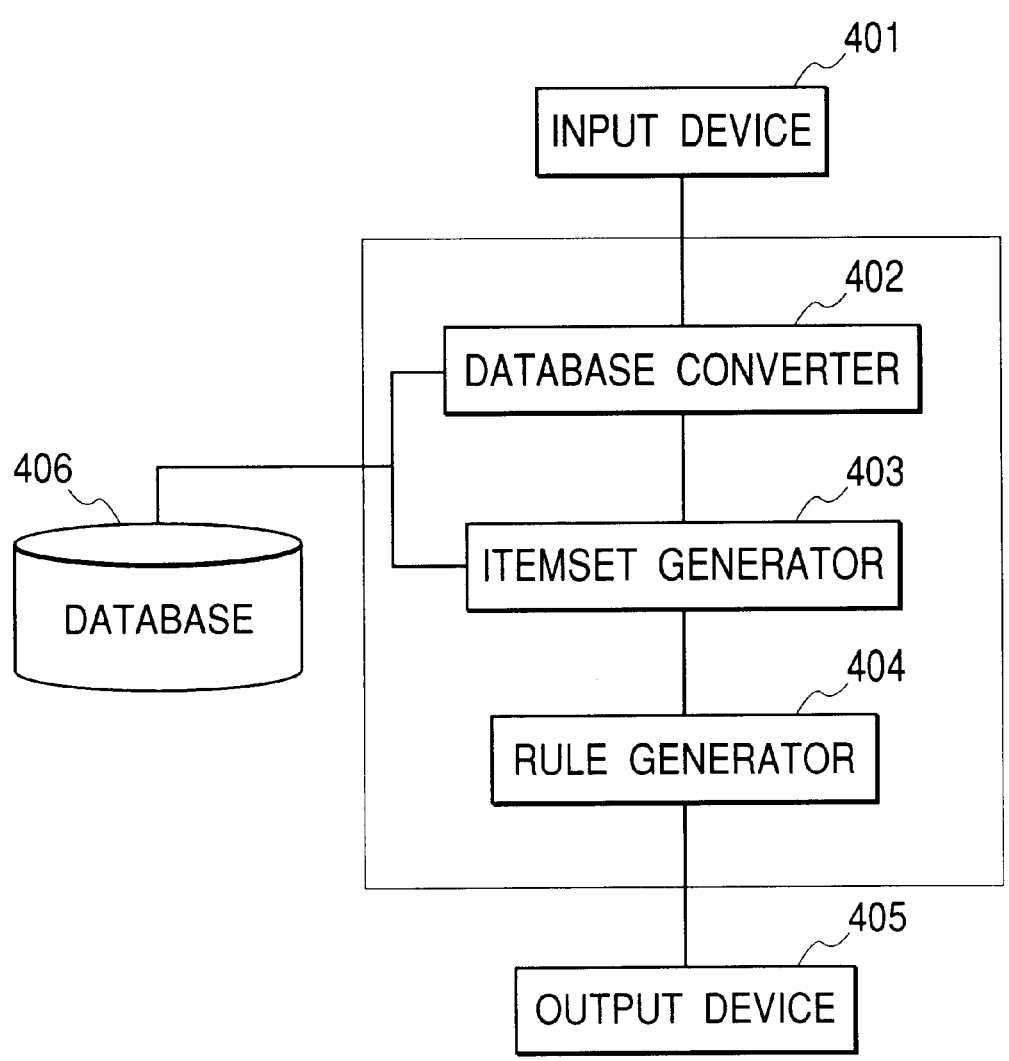
FIG. 4 is a diagram showing an arrangement of a system for mining association rules according to the present invention.

Next, a system arrangement of one embodiment for mining the association rules according to the present invention is explained. In FIG. 4, the system comprises an input device (401) where at least one condition of the association rules to be mined is inputted by a user, a database converter (402) for preparing database partitions and bit strings, an itemset generator (403) for preparing a candidate itemset, i.e. a candidate to constitute the association rule, for retrieving database and for counting at least one support count of the candidate itemset, and for finding at least one frequent itemset, which satisfies the condition of the minimum support inputted by the user, a rule generator (404) for generating association rules from the frequent itemset, and an output device (405) for outputting the mined association rules. A database (406) is connected to the database converter (402) and the itemset generator (403). Association rule mining procedure is shown in the block diagram of FIG. 1.

First, in the input device (401), conditions set for the association rule to be mined as inputted by the user is acquired. According to the present invention, three types of conditions are acquired as the conditions for the association rule: a minimum support, a minimum confidence and a minimum confidence increment. In the present embodiment, the minimum support is set to 25%, the minimum confidence is set to 80%, and minimum confidence increment is set to 1% by the user, for example.

Figure 5:
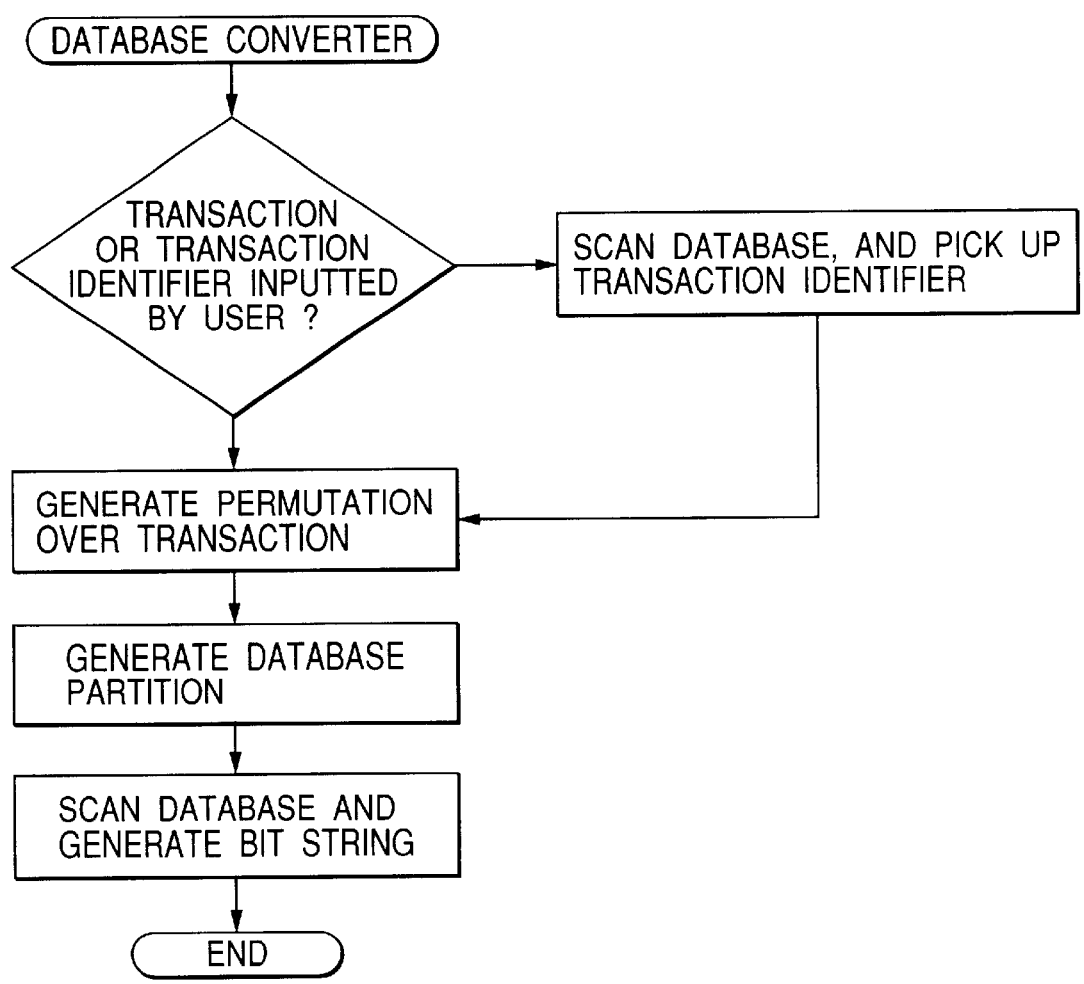
FIG. 5 is a flow chart for processing in a database converter according to the present invention.
Figure 6:
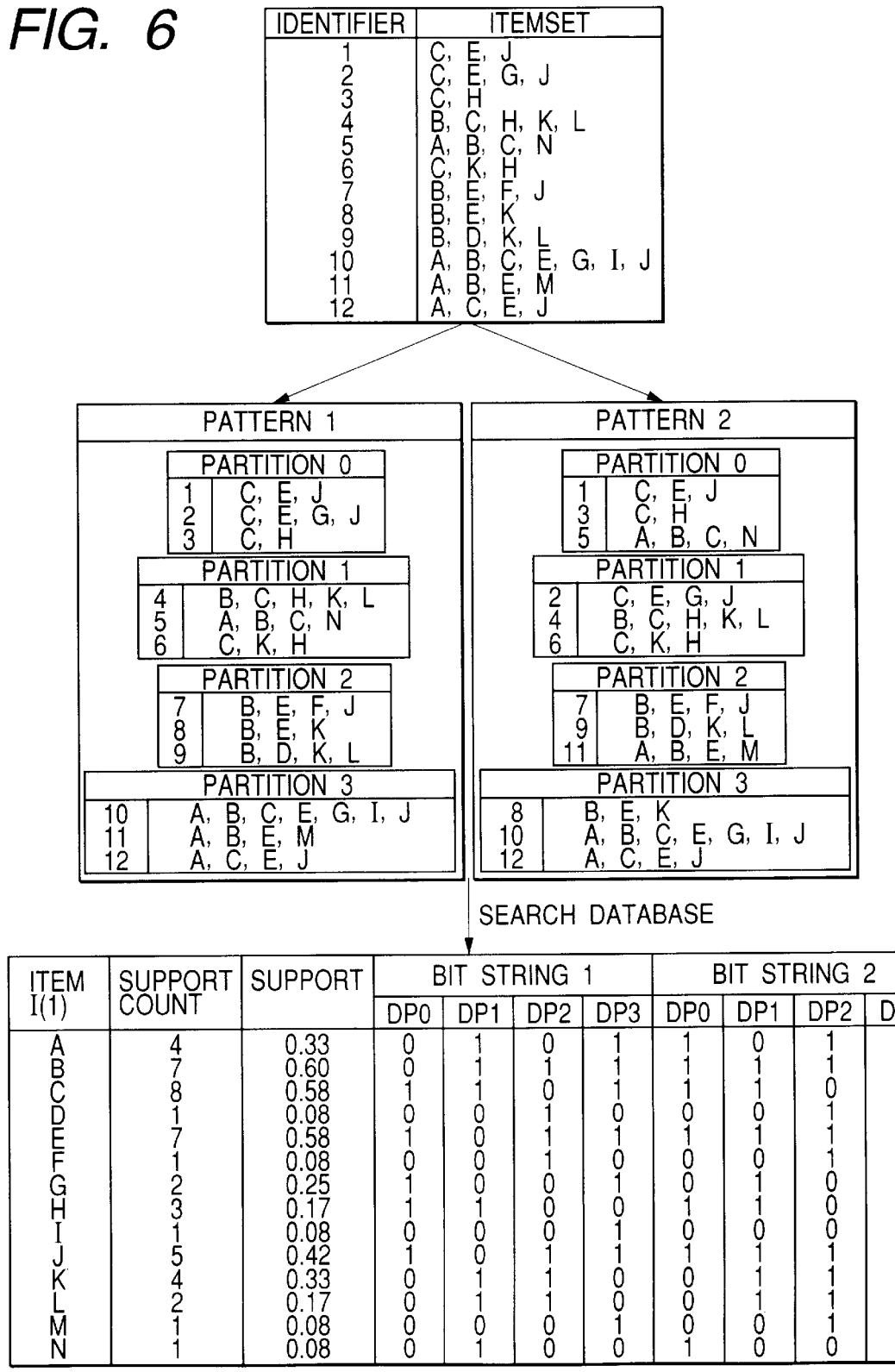
FIG. 6 shows examples of database and bit strings of one embodiment of the present invention.

Next, in the database converter (402), a bit string is prepared for pruning candidate itemsets at the itemset generator (403). FIG. 5 shows a procedure for preparing the bit strings. Each record of the database is divided to a plurality of partitions. The database may be divided to any number of partitions as designated by the user. In a bit string, an item contained in the record in each partition is set to 1, and an item absent from the record is set to 0. As an example, it is assumed that a database as shown in FIG. 2 is the database to be processed. The database contains 14 alphabetic characters from A to N as items, and it comprises 12 records. Each record comprises a record identifier for identifying the record and a list of items. Here, it is supposed that the database is divided to 4 partitions of two pattern types as shown in FIG. 6. In this example, 3 records with record identifiers 1, 2 and 3 are assigned to a partition 0 of the first pattern. The database is retrieved and it is checked whether each item is contained in the partition. For instance, an item A is contained in each of the records with record identifiers 5, 10, 11 and 12. Accordingly, the bit string corresponding to the first pattern of the item A is a bit string where the bit of either of the partitions 1 and 3 is 1, and the bit of each other partitions is 0, i.e. a bit string 0101. A bit string corresponding to the second pattern is a bit string 1011, where the bit of each of the partitions 0, 2 and 3 is 1. Similar processing is performed for the other items, and bit strings as shown in FIG. 6 are prepared.

Next, at the itemset generator, all of the frequent itemsets are compiled. At the itemset generator, an itemset, i.e. a combination of items serving as a candidate of the association rule, is generated. The support of each itemset is obtained. When the support of the itemset satisfies a minimum support designated by the user, it is sorted out as a frequent itemset. At the rule generator (404), at least one association rule is derived by utilizing the frequent itemset. The processing at the itemset generator varies depending upon whether the frequent itemset containing only affirmative items as inputted by the user.

Figure 7:
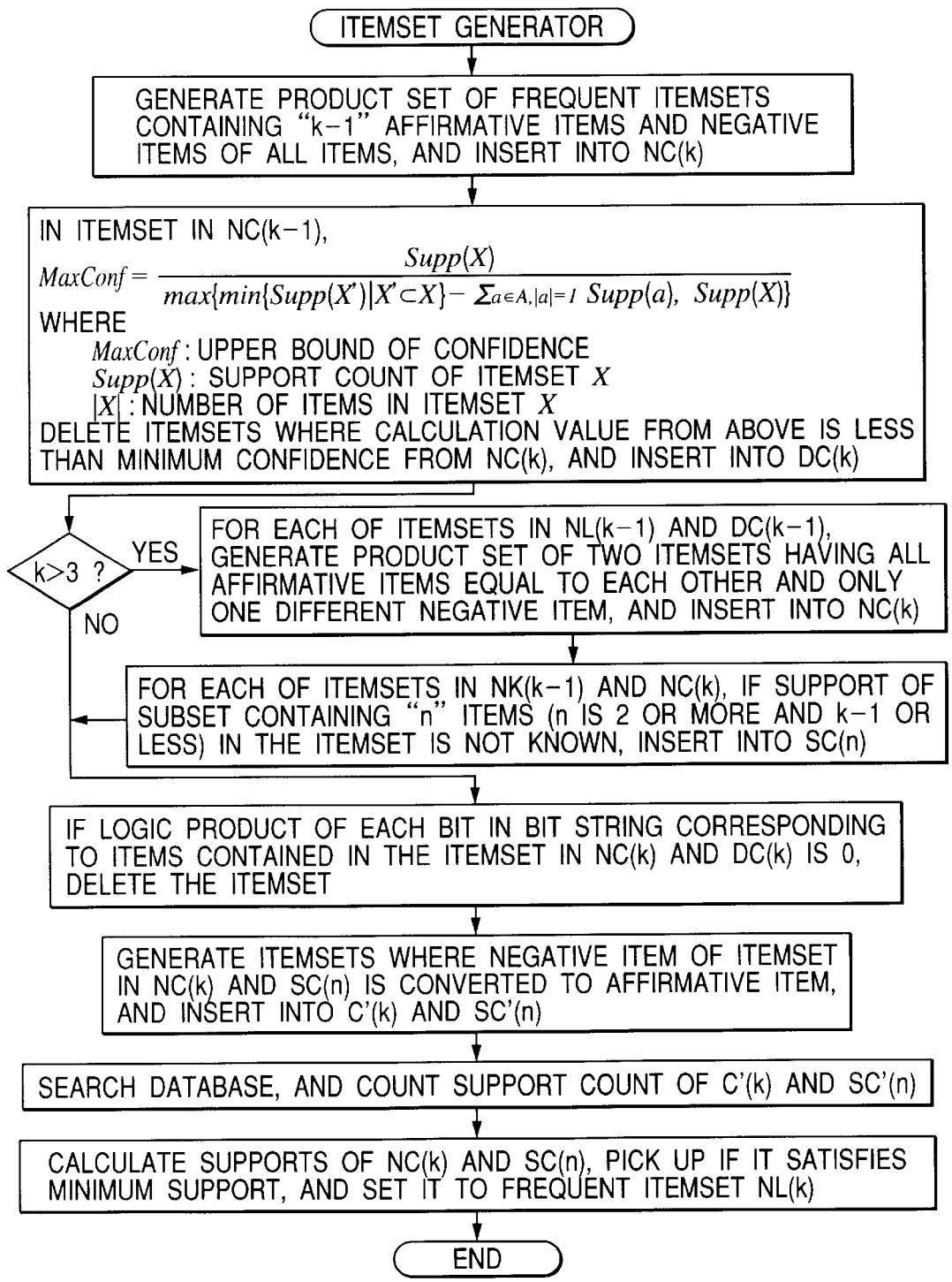
FIG. 7 is a flow chart for processing in an itemset generator according to the present invention.

First, the discussion assumes that a frequent itemset containing only affirmative items is inputted by the user. As mentioned, the prior art can efficiently obtain the frequent itemset containing only affirmative items, such as the references 2 and 3. The block diagram of FIG. 7 shows a processing of a case where the support of the frequent itemset containing only affirmative items generated by the itemset generator, and the support of the frequent itemset are already known. First, negative items of a frequent itemset L (2) containing two affirmative items, all items I (1) contained in at least one record in the database are combined together, and an itemset NC (3,1) containing three items including one negative item is prepared. Hereinafter, each of "n" and "a" is set as an integer of 1 or more respectively, and a set of itemsets with support counts and supports both unknown and containing "n" negative items and "a" affirmative items is expressed as NC (a+n,n). In an example of the database shown in FIG. 6, when an itemset shown in FIG. 8 is inputted as a frequent itemset containing only affirmative items mined from the database, by taking a product set of an itemset BC in L (2) of FIG. 8 and an item A in I (1) of FIG. 6, a candidate itemset BC~A is prepared. For each itemset in NC (3,1), an upper bound of confidence of an association rule containing negative items in the assumption derived from the itemset is calculated from the equation 1. Further, a minimum value of confidence of association rule is derived from the itemset, which is obtained by removing the negative items from the above itemset according to the equation 2. If the upper bound of the confidence is less than the minimum confidence or less than the minimum value of the confidence increment, the itemset is deleted from NC (3,1) and maintained separately from NC (3,1) in a candidate itemset DC (3,1). For instance, in the present example, by taking a product set of negative items of an itemsets BC in L (2) and an item D in I (1), BC~D is prepared. The upper bound of confidence of association rule containing negative items in the assumption is calculated as 50% according to the equation 1. This calculated value is less than 80% of the minimum confidence inputted by the user such that the itemset BC~D is deleted from NC (3,1) and it is maintained in DC (3,1).

Description of another method for pruning the candidate itemsets is described below. For each itemset in NC (3,1), the itemset is divided to affirmative items and negative items. The condition of a negative item is calculated by the equation 2. If the negative item does not satisfy the condition, the itemset is deleted from NC (3,1) and stored in the DC (3,1). For instance, in the itemset BC~G given in the above example, the condition is given by the user that the item D has a support count of 3.25 or more. However, the actual support count of the item D is 1 and this does not satisfy the condition. As a result, the itemset BC~D is deleted from NC (3,1) and removed to DC (3,1). The effect of pruning candidate itemsets using the equation 1 is equal to the effect of pruning candidate itemsets using the equation 2. Hereinafter, the candidate itemset, which is deleted from NC (x,y) by the equation 1 or 2 in the candidate itemset NC (x,y) and which support count is not sufficient, is expressed in DC (x,y).

Figure 9:
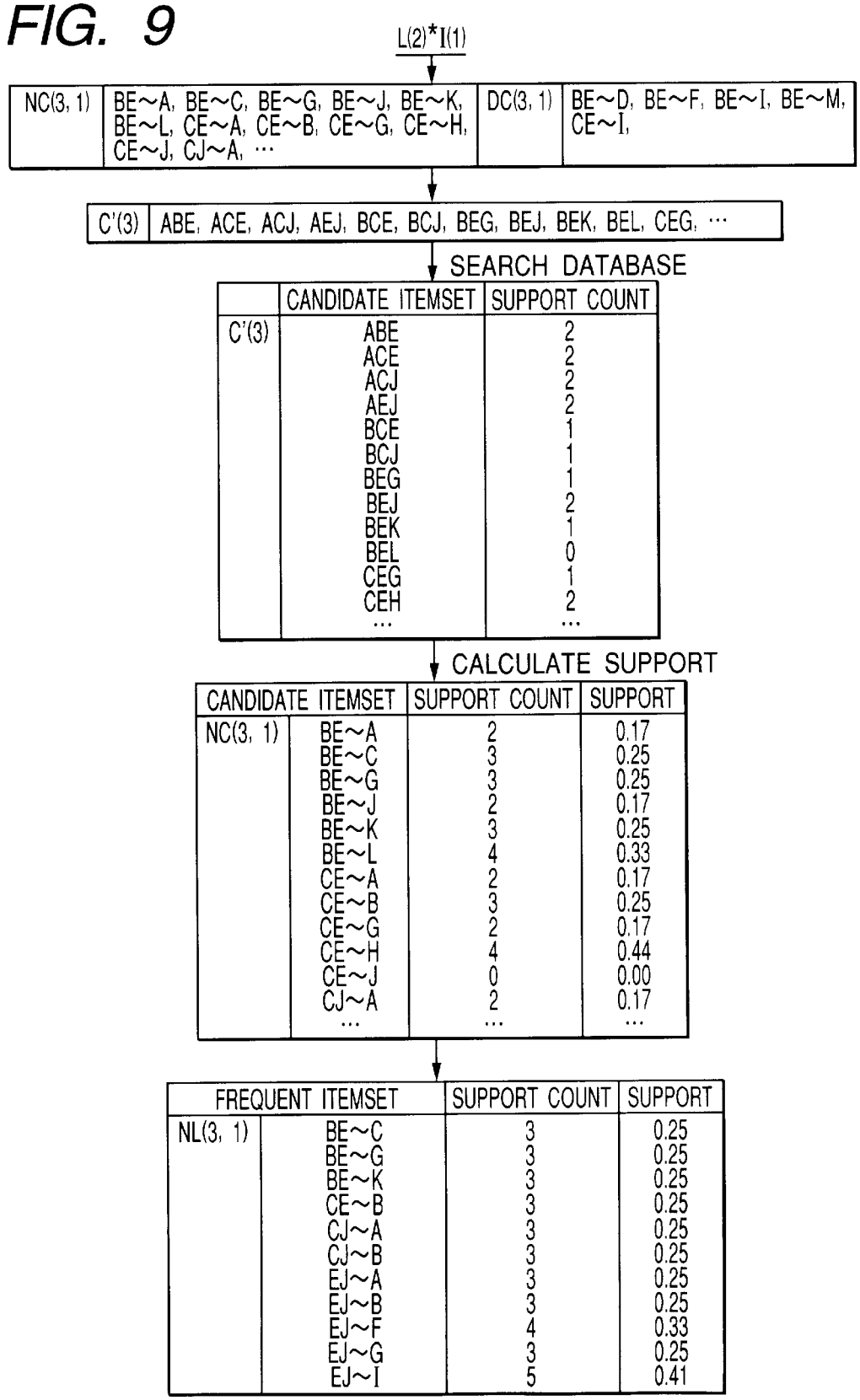
FIG. 9 shows an example of mining a frequent itemset containing negative items in one embodiment of the present invention.

Further, for each itemset in NC (3,1), if logic product for each bit in the bit string prepared at the database converter (402) and corresponding to the item in the itemset is 0000, the itemset is deleted from NC (3,1). Also, the itemset is deleted by using the bit string method in the same manner. For instance, the itemset AB~D is contained in NC (3,1) in the present example. From the bit string of FIG. 6, it is evident that the logic product for each bit in the bit string of the first pattern of the item in the itemset is 0000. Thus, AB~D is deleted from NC (3,1). Similarly, while the itemset BC~D is contained in DC (3,1), the logic product of bit string of the itemset is also 0000. Thus, AB~D is deleted from NC (3,1). By performing a similar procedure for the other itemsets, NC (3,1) and DC (3,1) of the present example are as shown in FIG. 9.

Next, an itemset is prepared, in which negative items of the itemset in NC (3,1) is converted to affirmative items, and it is set as a candidate itemset C' (3) with item count 3. Then, a counter of the itemset in C' (3) is prepared. Hereinafter, a set of itemsets with a support count and a support both unknown and comprising "k" number of affirmative items is expressed as C' (k).

The support count of the itemset in C' (3) is counted. When the compilation for all records has been completed, the support count of the items in NC (3,1) is calculated according to the equation 11 by using support count of the itemsets in C' (3) and L (2). The itemset, which support count satisfying the minimum support is sorted out, and a frequent itemset NL (3,1) is obtained, which contains one negative item and two affirmative items. Hereinafter, the itemset comprising "n" number of negative items and "a" number of affirmative items and satisfying the minimum support is expressed as NL (n+a,n). The processing for mining the frequent itemset comprising the above three items is called "pass 3".

By analogy, processing of a pass 4 is performed. Logic products of the itemsets L (3) and I (1) are obtained, and NC (4,1) is prepared. For the itemsets in NC (4,1), the pruning of candidate itemset is performed using the equation 1 or 2, and NC (4,1) and DC (4,1) are prepared. Further, for the frequent itemset in NC (3,1) and for the itemset with support unknown in DC (3,1), a product set of two itemsets having all affirmative items equal to each other is sorted out. An itemset containing two affirmative items and two negative items and with unknown support is prepared. If all subsets prepared from the itemset are contained in NL (3,1) or DC (3,1), the processing goes to NC (4,2). The block diagram of FIG. 7 shows the processing for generating candidate itemsets containing negative items from the itemsets containing the negative items. For each itemset in NC (4,2), the pruning is performed using the equation 1 or 2, and NC (4,2) and DC (4,2) are prepared. Further, in the same manner as in the pass 3, for each itemset in NC (4,1), NC (4,2), DC (4,1), and DC (4,2), the itemsets are deleted using the bit strings prepared in the database converter.

Further, for each itemset in NC (3,1), when the support of the itemset comprising two items prepared by the itemset is not known, this itemset is set as a candidate itemset SC (3). Hereinafter, the candidate itemset with an unknown support and having item count of 2 or more (less than "k") and prepared from the itemset NL (k,a) is expressed as SC (k). For instance, an itemset BE~C is contained in NL (3,1) as shown in FIG. 9. Because the supports and the support counts of subsets B~C and E~C prepared from the itemset is not known, the processing goes to SC (3).

Figure 10:
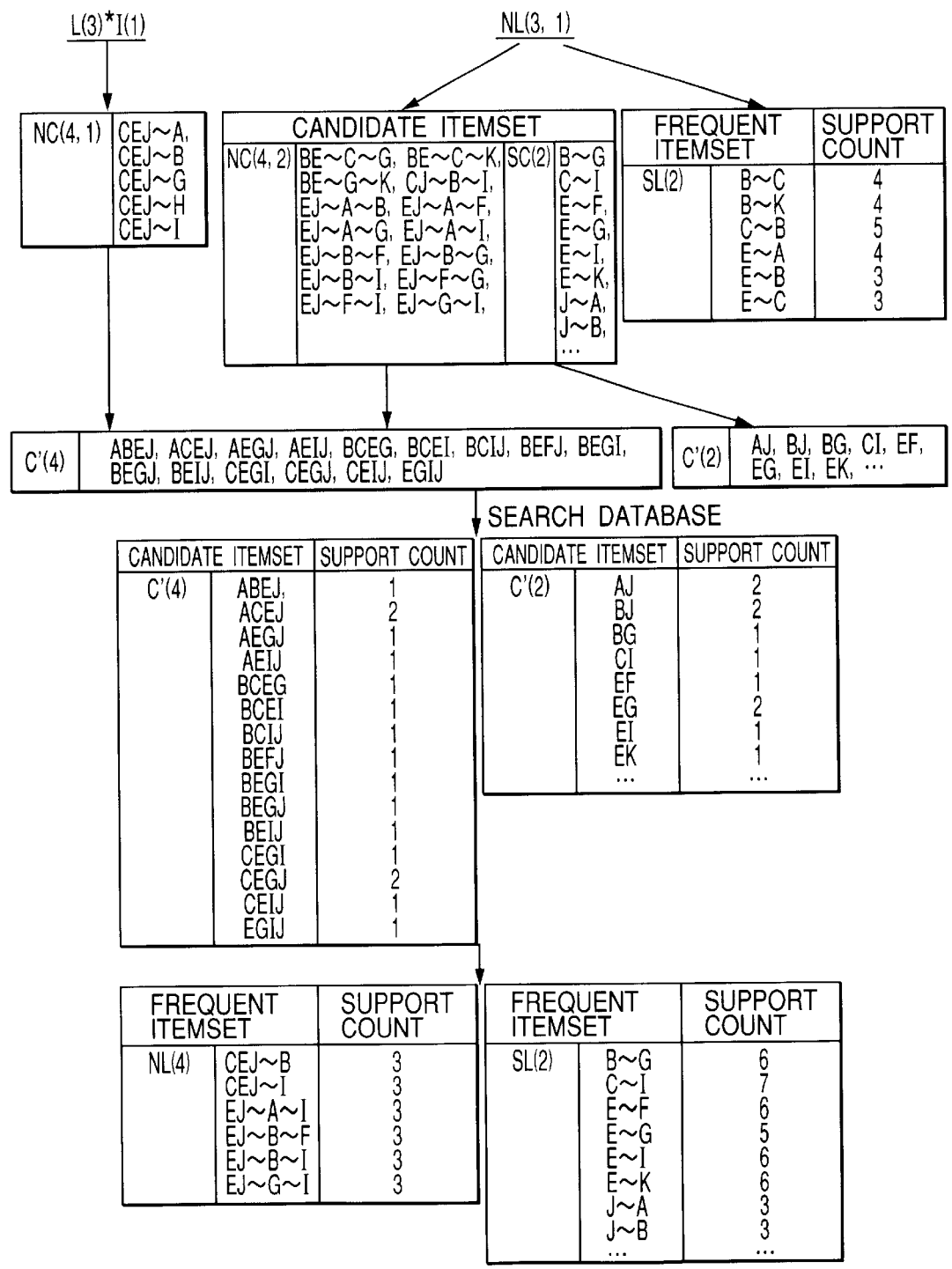
FIG. 10 shows mining an example of another frequent itemset containing negative items in one embodiment of the present invention.

For the itemsets in NC (4,1), NC (4,2), and SC (3), itemsets C' (4) and SC' (3) are prepared, which have negative items of the itemset converted to the affirmative items, and a counter is prepared for each itemset. A support count of the itemset is counted. The support counts of each of NC (4,1), NC (4,2), and SC (3) are calculated according to the equation 11. Itemsets are sorted out, in which the calculated values satisfy the minimum support, and these are defined as NL (4,1), NL (4,2) and SL (3) respectively. Examples of the above processing are shown in FIG. 10. Hereinafter, the entire set of itemsets comprising "k" items and having support unknown is expressed by:

$$NC(k) := \sum_{i=1}^{k-2} NC(k, i) \qquad \text{(Equation 12)}$$

(where k is an integer of 3 or more). Also, an entire set of the frequent itemsets comprising "k" items including some negative items is expressed by:

$$NL(k) := \sum_{i=1}^{k-2} NL(k, i) \qquad \text{(Equation 13)}$$

(where k is an integer of 3 or more).

Hereinafter, k is defined to an integer of 4 or more. The processing of the pass "k" is as follows: (A product set of a frequent itemset L (k-1) containing (k-1) affirmative items and all items I (1) contained in the database is obtained). Then, an itemset NC (k,1) containing one negative item and (k-1) affirmative items and having support unknown is prepared. Also, "n" is defined as an integer of 1 or more. For the itemsets in NL (k-1,n) and DC (k-1,n) found in the process of the pass (k-1), a product set of the itemsets is obtained by joining frequent itemsets, in which all affirmative items are equal to each other and (n-1) negative items are equal to each other. When all itemsets prepared by deleting one affirmative item from the itemset contained in NL (k-1) or DC (k-1,n), it is set as NC (k,n+1). Next, for the itemsets in NC (k), pruning is performed using the equation 3 or the equation 4, and NC (k) and DC (k) are prepared. Further, upon each itemset in NC (k) and DC (k) respectively, pruning is performed using the bit string method. For the itemset in the remaining NC (k), an itemset with negative items converted to affirmative items is prepared, and this is defined as a candidate itemset C' (k) with an item count "k". Further, in the frequent itemsets in the sets NL (k-1, 1), . . . , NL (k-1,k-3) of the frequent itemsets mined in the pass (k-1), if there is an itemset, which is a subset of the above itemsets and comprises "n" negative items and "a" affirmative items (where "n" and "a" each represents an integer of 1 or more) and which support is unknown, the above subset is defined as SC (n+a). Here, (n+a) represents an integer of 2 or more which is less than (k-1). For the itemset in SC (n+a), an itemset with negative items converted to affirmative items is prepared, and this is defined as SC' (n+a). The support count of each of the itemsets in NC' (k) and SC' (k-1), . . . , SC (2) are calculated. The support count of each of the itemsets in NC (k), SC (k-1), . . . , SC (2) are calculated according to the equation 8. Itemsets are sorted out, which the calculated values satisfy the minimum support, and defined as frequent items containing negative items, i.e., NL (k) and NL (k-1), . . . , NL (2). When a new frequent itemset is mined, k is incremented by 1, and the processing of the pass k is performed. If a new frequent itemset is not mined, the processing for generating the frequent itemsets is completed.

Next, description will be given on a case where the user did not input any frequent itemset containing only affirmative items. In this case, the following processing is performed prior to the pass 3. The support count of each affirmative item are calculated. An item satisfying minimum support is sorted out, and defined as a frequent itemset L (1) with item count 1. Hereinafter, it is supposed that k is an integer, and a frequent itemset containing "k" affirmative items is expressed as L (k). Next, a product set of two affirmative items is prepared from the affirmative items in L (1), and an itemset C (2) with its support and its support count unknown is prepared. This itemset is called as a candidate itemset. Then, k is an integer, and a candidate itemset containing "k" affirmative items is expressed as C (k). Again, the support count of the candidate itemset in C (2) is calculated. An itemset satisfying the minimum support is sorted out and defined as L (2). Next, the processing of the above pass 3 is performed. However, in addition to the candidate itemset C' (3) in the pass 3, an itemset C (3) containing 3 affirmative items and with its support and its support count both unknown is prepared using L (2). The calculation of support counts is performed at the same time as C' (3). At the same time as the processing for obtaining NL (3) in the pass 3, an itemset satisfying the minimum support is sorted out from the itemsets in C (3), and L (3) is determined. Hereinafter, k is set to an integer of 4 or more. During the processing of the pass "k", the itemsets L (k-1) to C (k) are prepared. The support count is counted, and L (k) is determined.

The processing for obtaining the frequent itemsets containing only affirmative items may be performed using the prior art methods as described in the reference 2, the reference 3, etc.

Next, in the rule generator, an association rule containing negative items is generated using the frequent itemsets mined by the itemset generator. It is supposed that "n" is an integer of 1 or more, and "a" is an integer of 2 or more. For a frequent itemset X~Y containing "n" negative items and "a" affirmative items (where X is an itemset of affirmative items, and ~Y is an itemset of negative items), a product set (A~B) of affirmative items (1 or more and less than "a") and at least one negative items prepared from the items in the itemset is prepared, and an association rule A~B⇒(X-A)(~Y-~B) is obtained. The confidence and the confidence increment of the association rule are calculated. If the confidence and the confidence increment satisfy the minimum confidence and the minimum confidence increment inputted by the user, it is mined as an association rule. For instance, two association rules B~C ⇒E and E~C⇒B are derived from the frequent itemset BE~C mined in the example. For the association rule E~C⇒B, support counts of the itemsets BE~C and E~C are both 3, and the confidence of the association rule is calculated as 100%. Also, the confidence of the association rule B⇒E obtained by deleting negative items from the assumption of the association rule is 57%, and the confidence increment is calculated as 43%. In the present example, minimum confidence is 80% and minimum confidence increment is 1%. Thus, the association rule E~C⇒B is mined. Similar procedure is performed for all other frequent itemsets such that all association rules are mined.

Finally, at the output device, all association rules generated by the rule generator are displayed.

As described above, an association rule containing negative items can be mined according to the present invention. Also, it is possible according to the present invention to decrease combinations of items, which are turned into candidates of the association rule to be mined.

The foregoing invention has been described in terms of preferred embodiments. However, those skilled in the art will recognize that many variations of such embodiments exist. Such variations are intended to be within the scope of the present invention and the appended claims.

What is claimed is:

1. A method for mining at least one association rule based upon data in a database containing a plurality of records, each including at least an attribute value with respective to an attribute among a plurality of attributes, comprising:

defining each of the attributes with a respective attribute value as an item; and defining the database as a plurality sets of items, and defining each of the sets of items in the database as a record;

defining an item appearing in one of the records as an affirmative item in the record, and defining an item absent from the record as a negative item in the record; and mining the association rule which is defined by a logical AND of items containing at least one negative item and at least one affirmative item as an assumption of the association rule and at least one affirmative item as a conclusion of the association rule.

2. A method for mining at least one association rule based upon data in a database containing attributes comprising:

defining each of the attributes with a respective attribute value as an item, and defining the database as a plurality sets of items, and defining each of the sets of items in the database as a record;

defining an item appearing in one of the sets as an affirmative item in the set, and defining an item absent from the set as a negative item in the set;

mining the association rule by applying at least one logical AND operation on an assumption of one association rule containing at least one negative item and at least one affirmative item so as to obtain a conclusion of the association rule containing at least one affirmative item;

applying at least one logical AND operation on at least two items to generate an itemset;

providing plurality sets of itemsets to be included in the database;

defining a support count of one item or one itemset as a number of times the item or the itemset appearing in different records of the database;

defining a support count of one association rule as the support count of the itemset in (the assumption AND the conclusion);

calculating a support of the item, the itemset or the association rule by dividing the support count of the item, the itemset or the association rule with a total number of records in the database;

calculating a confidence of the association rule by dividing a support count of the itemset in (the assumption AND the conclusion) with a support of the item or the itemset in the assumption; and for the association rule containing at least one negative item in the assumption, calculating a confidence increment by omitting the negative item in the assumption of the association rule thereby calculating a confidence of a simplified association rule, which is obtained by omitting the negative item from the assumption of the association rule, to obtain an evaluation value, and dividing the confidence of the association rule with the evaluation value.

3. The method for mining at least one association rule according to claim 2, further comprising:

inputting a minimum value of support, a minimum value of confidence, and a minimum value of confidence increment of the association rule, whereby the mining step, frequent itemsets, which satisfies the minimum value of support, are used to sort out association rules, which consist of frequent itemsets and satisfy the minimum value of confidence as well as the minimum value of confidence increment.

4. The method for mining at least one association rule according to claim 2, further comprising:

inputting a minimum value of support, a minimum value of confidence, and a minimum value of confidence increment of the association rule;

providing a itemset X containing at least two affirmative items and being applied upon a logical AND operation in conjunction with a negative item ~a to generate a candidate itemset X~a so as to provide a plurality of candidate itemsets;

calculating an upper bound of confidence of a candidate itemset X~a by estimating a confidence value for each of the association rule, which a candidate itemset X~a can generate, by calculating a support count of each of subset itemsets X' of the frequent itemset X ("Supp(X')"), a support count of an inverted item a of the negative item ~a in X~a ("Supp(a)"), and a support count of X ("Supp(X)"), selecting the smallest value in {Supp(X')}, and selecting a bigger value in {(the smallest value of Supp(X'))-Supp(a),Supp(X)};

sorting out candidate itemsets, each of which upper bound of confidence is bigger than the minimum value of confidence thereby compiling the frequent itemsets; and sorting out frequent itemsets from the plurality of candidate itemsets, which satisfies the minimum value of support thereby compiling association rules, which consist of frequent itemsets.

5. The method for mining at least one association rule according to claim 2, further comprising:

inputting a minimum value of support, a minimum value of confidence, and a minimum value of confidence increment of the association rule;

providing an itemset X containing at least two affirmative items and being applied upon a logical AND operation in conjunction with an itemset ~A containing at least two negative items to generate a candidate itemset X~A so as to provide a plurality of candidate itemsets;

calculating an upper bound of confidence of a candidate itemset X~A by estimating the confidence value for each of the association rules, which a candidate itemset X~A can generate, by calculating a support count of each of the subset itemset X' of the frequent itemset X ("Supp(X')"), the sum of support counts of inverted items in the itemset ~A ("Sum(A)"), and a support count of X ("Supp(X)"), selecting the smallest value of {Supp(X')}, and selecting bigger value in {(the smallest value of Supp(X'))-Sum(A), Supp(X)};

sorting out candidate itemsets, each of which upper bound of confidence is bigger than the minimum value of confidence thereby compiling the frequent itemsets; and sorting out frequent itemsets from the plurality of candidate itemsets, which satisfies the minimum value of support thereby compiling association rules, which consist of frequent itemsets.

6. The method for mining at least one association rule according to claim 4, wherein the upper bound of confidence of the candidate itemset X~a generated by conjunction at least two affirmative items and a negative item is calculated from:

$$MaxConf = \frac{Supp(X)}{\max\{\min\{Supp(X') \mid X' \subset X\} - Supp(a), Supp(X)\}} \quad \text{(Equation 1)}$$

where MaxConf: Upper bound of confidence and a candidate itemset is disregarded if said upper bound is less than the minimum value of confidence.

7. The method for mining at least one association rule according to claim 4, further comprising:

calculating a minimum value of support count of an inversed item "a" of the negative item "~a" constituting the candidate itemset X~a generated by conjunction at least two affirmative items and a negative item from:

$$\theta(a) = \min\{Supp(X') \mid X' \subset X\} - \frac{Supp(X)}{(\text{Minimum confidence})} \quad \text{(Equation 2)}$$

where $\theta(a)$: Minimum value of support count of item "a", whereby the sorting step, only itemsets which support count of the inverted item of the negative item in X~a is equal to or larger than the calculated minimum value of support count, are considered as candidate itemsets.

8. The method for mining at least one association rule according to claim 5, wherein each of the candidate itemsets X~A is obtained by applying logical AND operations on "y" number of affirmative items and "z" number of negative items, where "y" is an integer of 2 or more and "z" is an integer of 2 or more, and the upper bound of confidence is calculated from:

$$MaxConf = \frac{Supp(X)}{\max\left\{\min\{Supp(X') \mid X' \subset X\} - \sum_{a \in A, |a|=1} Supp(a), Supp(X)\right\}} \quad \text{(Equation 3)}$$

where MaxConf: Upper bound of confidence,

|X|: Number of items in itemset, and a candidate itemset is disregarded if said upper bound is less than the minimum value of confidence.

9. The method for mining at least one association rule according to claim 5, wherein each of the candidate itemsets X~A is obtained by applying logical AND operations on "y" number of affirmative items and "z" number of negative items, where "y" is an integer of 2 or more and "z" is an integer of 2 or more, a minimum value of sum of support counts of inverted items in the itemset ~A is calculated from:

$$\theta(A) = \min\{Supp(X') \mid X' \subset X\} - \quad \text{(Equation 4)}$$

$$\frac{Supp(X)}{(\text{Minimum confidence})}$$

(Minimum confidence)

where $\theta(a)$: Minimum value of a sum of support counts of items in the itemset A, whereby the sorting step, only itemsets, which sum of support count of the inverted items of each negative items in X~A is equal to or larger than the calculated minimum value of support count, are considered as candidate itemsets.

10. The method for mining at least one association rule according to claim 2, wherein said method further comprising the steps of:

dividing the database into a plurality of partitions in possible ways;

generating a bit vector for each affirmative items in the database based upon whether the item appears in each of the partitions by assigning 1 to a p-th bit if the candidate itemset appears in the p-th partition or 0 if the candidate itemset is absent from the p-th partition; and disregarding a candidate itemset if none of the partitions having 1 in the bit vector for all items contained in the candidate itemset.

11. The method for mining at least one association rule according to claim 2, wherein said method further comprising the steps of:

dividing the database into a plurality of partitions in possible ways; and disregarding a candidate itemset if none of the partitions contains all items contained in the candidate itemset.

12. A system for mining at least one association rule based upon data in a database containing a plurality of records, each including at least an attribute value with respective to an attribute among a plurality of attributes, comprising:

means for defining each of the attributes with a respective attribute value as an item;

means for defining an item appearing in one of the records as an affirmative item in the record, and for defining an item absent from the record as a negative item in the record; and means for mining the association rule which is defined by a logical AND of items containing at least one negative item and at least one affirmative item as an assumption of the association rule and at least one affirmative item as a conclusion of the association rule.

13. A system for mining at least one association rule based upon data in a database containing attributes comprising:

means for defining each of the attributes with a respective attribute value as an item, and for defining the database as a plurality sets of items, and for defining each of the sets of items in the database as a record;

means for defining an item appearing in one of the sets as an affirmative item in the set, and for defining an item absent from the set as a negative item in the set; and means for mining the association rule by applying at least one logical AND operation on an assumption of one association rule containing at least one negative item and at least one affirmative item so as to obtain a conclusion of the association rule containing at least one affirmative item means for applying at least one logical AND operation on at least two items to generate an itemset;

means for providing plurality sets of itemsets to be included in the database;

defining a support count of one item or one itemset as a number of times the item or the itemset appearing in different records of the database;

means for defining a support count of one association rule as the support count of the itemset in (the assumption AND the conclusion);

means for calculating a support of the item, the itemset or the association rule by dividing the support count of the item, the itemset or the association rule with a total number of records in the database;

means for calculating a confidence of the association rule by dividing a support count of the itemset in (the assumption AND the conclusion) with a support of the item or the itemset in the assumption; and means for calculating a confidence increment, for the association rule containing at least one negative item in the assumption, by omitting the negative item in the assumption of the association rule thereby calculating a confidence of a simplified association rule, which is obtained by omitting the negative item from the assumption of the association rule, to obtain an evaluation value, and for dividing the confidence of the association rule with the evaluation value.

14. The system for mining at least one association rule according to claim 13, further comprising:

means for inputting a minimum value of support, a minimum value of confidence, and a minimum value of confidence increment of the association rule, wherein the mining means uses frequent itemsets, which satisfies the minimum value of support, to sort out association rules, which consist of frequent itemsets and satisfy the minimum value of confidence as well as the minimum value of confidence increment.

15. The system for mining at least one association rule according to claim 13, further comprising:

means for inputting a minimum value of support, a minimum value of confidence, and a minimum value of confidence increment of the association rule;

means for providing a itemset X containing at least two affirmative items and being applied upon a logical AND operation in conjunction with a negative item ~a to generate a candidate itemset X~a so as to provide a plurality of candidate itemsets;

means for calculating an upper bound of confidence of a candidate itemset X~a by estimating a confidence value for each of the association rule, which a candidate itemset X~a can generate, by calculating a support count of each of subset itemsets X' of the frequent itemset X ("Supp(X')"), a support count of an inverted item a of the negative item ~a in X~a ("Supp(a)"), and a support count of X ("Supp(X)"), and selecting the smallest value in {Supp(X')}, and selecting a bigger value in {(the smallest value of Supp(X'))-Supp(a), SuPP(X)} means for sorting out candidate itemsets, each of which upper bound of confidence is bigger than the minimum value of confidence thereby compiling the frequent itemsets; and means for sorting out frequent itemsets from the plurality of candidate itemsets, which satisfies the minimum value of support thereby compiling association rules, which consist of frequent itemsets.

16. The system for mining at least one association rule according to claim 13, further comprising:

means for inputting a minimum value of support, a minimum value of confidence, and a minimum value of confidence increment of the association rule;

means for providing an itemset X containing at least two affirmative items and being applied upon a logical AND operation in conjunction with an itemset ~A containing at least two negative items to generate a candidate itemset X~A so as to provide a plurality of candidate itemsets;

means for calculating an upper bound or confidence of a candidate itemset X~A by estimating the confidence value for each of the association rules, which a candidate itemset X~A can generate, by calculating a support count of each of the subset itemset X' of the frequent itemset X ("Supp(X')"), the sum of support counts of inverted items in the itemset ~A ("Sum(A)"), and a support count of X ("Supp(X)"), selecting the smallest value of {Supp(X')}, and selecting bigger value in {(the smallest value of Supp(X'))-Sum(A), Supp(X)};

means for sorting out candidate itemsets, each of which upper bound of confidence is bigger than the minimum value of confidence thereby compiling the frequent itemsets; and means for sorting out frequent itemsets from the plurality of candidate itemsets, which satisfies the minimum value of support thereby compiling association rules, which consist of frequent itemsets.

* * * * *